United States Patent
Kurita et al.

[11] Patent Number: 6,144,629
[45] Date of Patent: Nov. 7, 2000

[54] DISC CARTRIDGE LOADING APPARATUS

[75] Inventors: Kazuhito Kurita, Kanagawa; Kiyoshi Toda, Saitama, both of Japan

[73] Assignee: Sony Corporation, Tokyo, Japan

[21] Appl. No.: 09/011,020

[22] PCT Filed: Jun. 5, 1997

[86] PCT No.: PCT/JP97/01916

§ 371 Date: May 4, 1998

§ 102(e) Date: May 4, 1998

[87] PCT Pub. No.: WO97/47005

PCT Pub. Date: Dec. 11, 1997

[30] Foreign Application Priority Data

Jun. 5, 1996 [JP] Japan .................. P8-142917

[51] Int. Cl.[7] .................................................. G11B 17/04
[52] U.S. Cl. ........................................ 369/77.2; 360/99.06
[58] Field of Search .......................... 369/77.2, 75.1, 369/13; 360/99.02, 99.06

[56] References Cited

U.S. PATENT DOCUMENTS

| | | | |
|---|---|---|---|
| 4,675,756 | 6/1987 | Saitoh et al. | 360/71 |
| 5,504,730 | 4/1996 | Kanada | 369/75.1 |
| 5,583,834 | 12/1996 | Kanada et al. | 369/13 |
| 5,642,344 | 6/1997 | Yamada et al. | 369/77.2 |
| 5,663,850 | 9/1997 | Nakanishi et al. | 360/98.06 |

FOREIGN PATENT DOCUMENTS 7-85560  3/1995  Japan .

Primary Examiner—David L. Ometz
Assistant Examiner—Angel Castro
Attorney, Agent, or Firm—Limbach & Limbach LLP

[57] ABSTRACT

A loading device for loading a disc cartridge having a groove formed on its one lateral surface for extending along an inserting direction and a shutter provided for movement along the lateral surface formed with said groove. The loading device includes a holder for insertion of the disc cartridge and for holding the inserted disc cartridge. The holder is movable between a first position for insertion or ejection of the disc cartridge and a second position lowered from the first position. The loading device also includes an ejection lever movably mounted on the holder. The ejection lever is at least partially inserted into the groove of the disc cartridge on completion of insertion of the disc cartridge into the holder, and is biased in a direction of ejecting the disc cartridge inserted into the holder from the holder. The loading device also includes a holding unit for holding said ejection lever at the insertion end position of insertion of the disc cartridge into the holder and for releasing the holding on the ejection lever when the holder is moved from the second position to the first position.

12 Claims, 11 Drawing Sheets

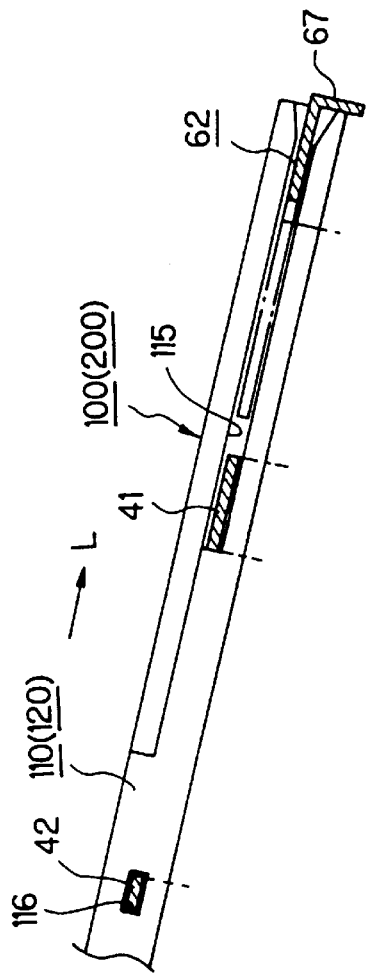
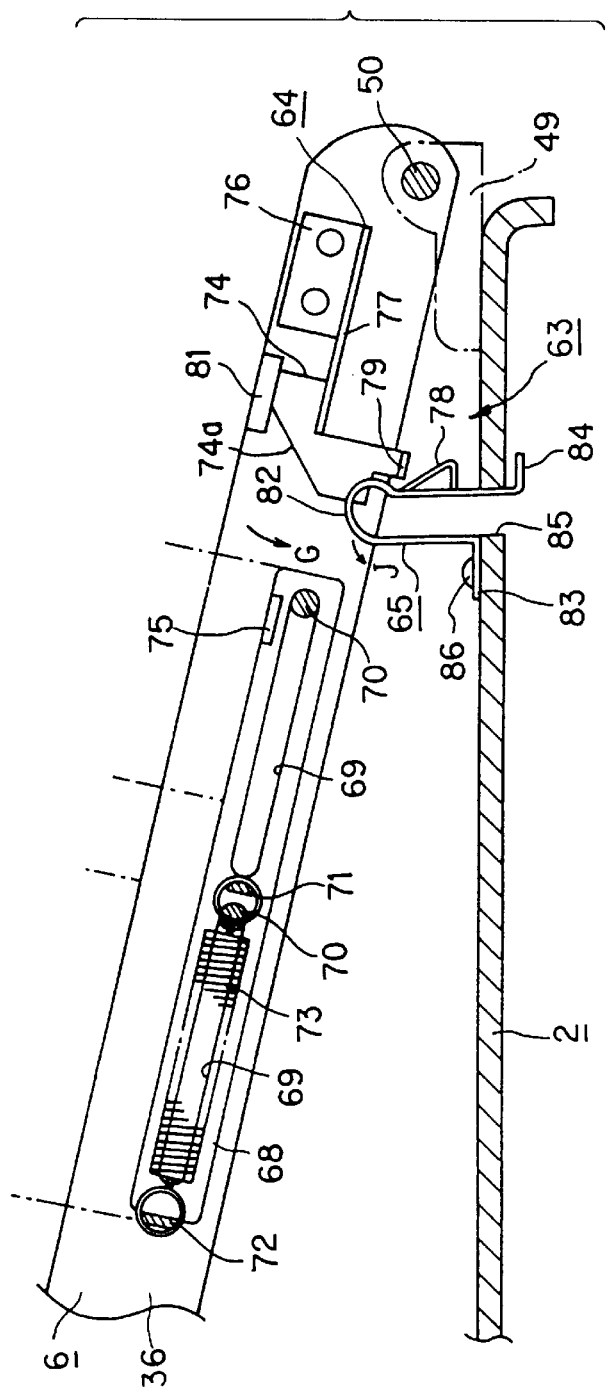
FIG.12B
FIG.12A

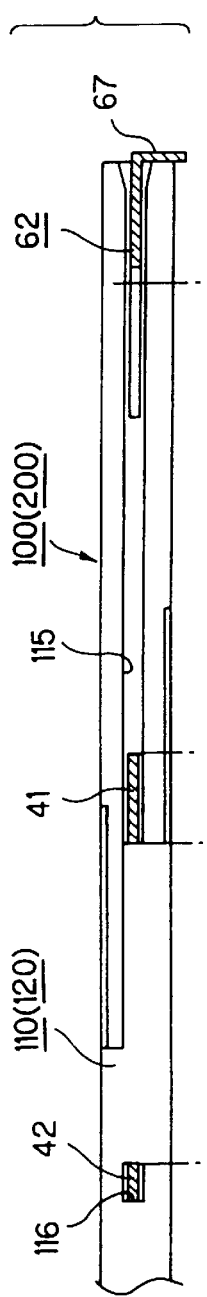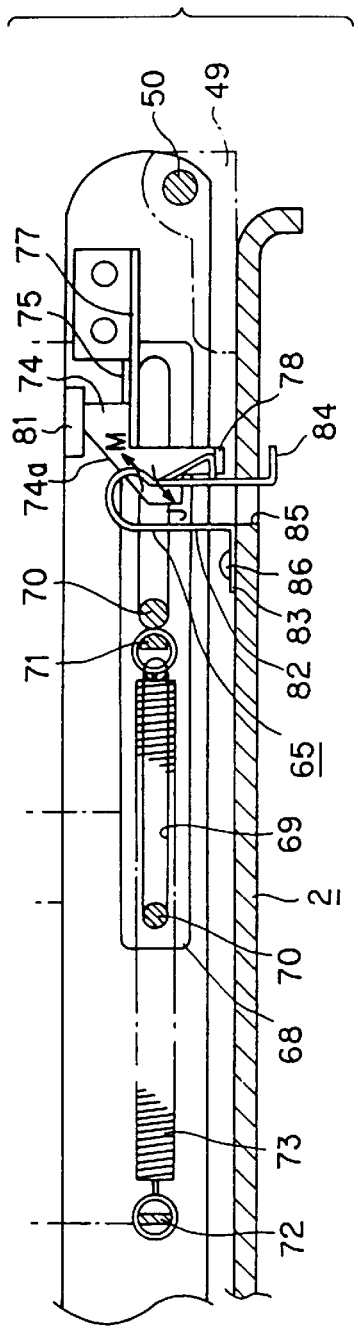
FIG.14B
FIG.14A

DISC CARTRIDGE LOADING APPARATUS

TECHNICAL FIELD

This invention relates to a loading device for loading a disc cartridge having housed therein a disc such as an optical disc or a magneto-optical disc as a recording medium for information signals. More particularly, it relates to a loading device for effecting loading using a holder adapted for inserting and holding a disc cartridge therein.

BACKGROUND ART

Up to now, a disc recording and/or reproducing apparatus employing, as a recording medium, a disc, such as an optical disc or a magneto-optical disc, housed in the disc cartridge and operating as a recording medium for information signals was used.

The disc recording and/or reproducing apparatus employing an optical disc or a magneto-optical disc as a recording medium includes a disc rotating mechanism for rotating a disc and a disc driving mechanism having an optical pickup device and a magnetic head for recording/reproducing information signals on or from the disc thus rotated by the disc rotating mechanism.

This disc recording and/or reproducing apparatus includes a loading device for loading/unloading a disc cartridge on or from a disc driving unit.

Among the loading devices used for the disc recording and/or reproducing apparatus, there is such an apparatus employing a holder in which is inserted and held the disc cartridge. The holder constituting the loading device is rotatably supported on a base carrying the disc driving unit. The holder is adapted for being rotated about a pivot shaft operating as a support for the base. The disc cartridge is inserted into or removed from the holder when the latter has been rotated to a first position separated from the disc driving unit. When the holder, rotated about the pivot shaft, has been rotated to a second position proximate to the disc driving unit, the holder causes the disc cartridge held by the holder to be loaded in position on a cartridge loading section arranged on the base for clamping the disc housed in the disc cartridge in a state ready for being rotated in unison with the disc rotating mechanism. The disc rotating mechanism is then driven for rotating the disc, while the optical pickup device and the magnetic head are fed along the radius of the disc for recording and/or reproducing information signals.

The disc recording and/or reproducing apparatus, including the loading unit, provided with the holder, is provided with an ejection mechanism for ejecting the disc cartridge held by the holder out of the holder when the holder is rotated from the second position towards the first position. This ejection mechanism includes an ejection lever rotatably supported by the base and a tension spring for rotationally biasing this ejection lever. The ejection lever is rotated by the disc cartridge inserted into the holder, against the bias of the tension spring. When the disc cartridge has been inserted into the position of completion of insertion into the holder, the ejection lever is maintained at a position of not biasing the disc cartridge. The ejection lever is held by a holding mechanism provided on the base.

When the holder is rotated from the second position to the first position, the ejection lever ceases to be held by the holding mechanism and is rotated under the bias of the tension spring for thrusting the disc cartridge held by the holder for ejecting the disc cartridge from the holder.

As described above, in the ejection mechanism rotatably supported on the base, the ejection lever is rotated in the cartridge loading section arranged on the base, so that it becomes difficult to reduce the thickness of the loading mechanism further.

In particular, if the ejection lever is constructed for thrusting the inserting side front end face of the disc cartridge inserted into the holder, a thrusting portion of a width slightly smaller than the thickness of the disc cartridge needs to be used for reliably thrusting the disc cartridge. This increases the size of the ejection lever itself to render it difficult to further reduce the thickness of the loading device.

Moreover, the loading device becomes complex in structure because of the necessity of providing a mechanism on the base for holding the ejection lever adapted for not thrusting the ejection lever on loading the disc cartridge on the cartridge loading section and a mechanism for disengaging the ejection lever held by the holding mechanism, thus complicating the structure of the loading mechanism to render it difficult to further reduce the size of the loading device and the disc recording and/or reproducing apparatus provided with this loading device.

DISCLOSURE OF THE INVENTION

It is therefore an object of the present invention to provide a novel loading device for overcoming the problem inherent to the above-described loading device.

It is another object of the present invention to provide a loading device which realizes positive loading and ejection of the disc cartridge.

It is yet another object of the present invention to provide a loading device contributing to reduction in size and thickness of the disc recording and/or reproducing apparatus through further reduction in size and thickness of the loading device.

The loading device according to the present invention loads a disc cartridge having a groove extending along the direction of insertion of one lateral surface and a shutter movable along this lateral surface formed with the groove. The loading device includes a holder into which is inserted the disc cartridge and which holds the inserted disc cartridge. The holder is movable between the first position for disc cartridge insertion/ejection and a second position lower than the first position. On the holder is movably mounted an ejection lever at least partially intruded into the groove of the disc cartridge on completion of insertion of the disc cartridge into the holder. This ejection lever is biased in a direction of ejecting the disc cartridge into the holder out of the holder. The loading device also includes a holding unit for holding the ejection lever at the disc cartridge insertion completion position into the holder and for releasing the holding on the ejection lever when the holder is moved from the second position to the first position.

The ejection lever movably mounted on the holder includes an inserting portion inserted into the groove of the disc cartridge inserted into the holder and an abutment portion compressing against the disc cartridge inserted into the holder. The ejection lever is thrust by the disc cartridge by abutment of the abutment portion against the disc cartridge and in turn thrusts the disc cartridge. This abutment portion is formed at the distal end of the inserting portion substantially perpendicularly to the inserting portion for compressing against the front surface in the inserting direction into the holder of the disc cartridge.

The loading device according to the present invention also includes a biasing member for biasing the ejection lever in a direction of ejecting the disc cartridge inserted into the holder out of the holder.

The holding unit for holding the ejection lever at the position of completion of disc cartridge insertion includes a holding portion for engaging with the ejection lever moved by the disc cartridge inserted into the holder for holding the ejection lever, and a lock unit for holding the holder at the second position.

The holding unit also includes a holding member provided with a holding portion for holding the ejection lever. The lock unit includes a lock member for engaging with the holding member when the holder is in the second position. This lock unit releases the holding on the ejection lever by the holding portion when the holder is moved from the second position to the first position. When the holding of the ejection lever by the lock unit is released, the ejection lever thrusts the disc cartridge held by the holder in the ejecting direction from the holder.

The loading device according to the present invention loads a disc cartridge having a groove on its one lateral surface extending along the direction of insertion and a shutter movable along this lateral surface formed with the groove. The loading device includes a holder into which is inserted the disc cartridge and which holds the inserted disc cartridge. The holder has a substantially quadrilateral plate-shaped portion, paired sidewall sections formed on paired sides of the paired sidewall sections and a plurality of holding pieces formed on the distal ends of the paired sidewall sections. The holder is movable between a first position for insertion or ejection of the disc cartridge and a second position lowered from the first position. The holder also includes an ejection lever movably mounted on the holder. The ejection lever is moved by the disc cartridge inserted into the holder. The ejection lever is at least partially inserted into the groove of the disc cartridge on completion of insertion of the disc cartridge into the holder. The ejection lever is biased in a direction of ejecting the disc cartridge, inserted into the holder, out of the holder. The loading device includes a holding unit provided on one of the paired sidewall sections of the holder for holding the ejection lever at the insertion end position of insertion of the disc cartridge into the holder and for releasing the holding on the ejection lever when the holder is moved from the second position to the first position.

The ejection lever used in this loading device is arranged on the one sidewall section of the holder and includes an inserting portion formed substantially perpendicularly to the movable portion and which is inserted into a groove of the disc cartridge inserted into the holder and an abutment portion compressing against the disc cartridge inserted into the holder. The ejection lever is movably mounted on the one sidewall section of the holder.

Other objects and advantages of the present invention will become clearer from the following description of the preferred embodiments of the invention.

BRIEF DESCRIPTION OF THE DRAWINGS

FIGS. 12A and B are side views showing the disc cartridge inserted into the holder.

FIGS. 14A and B are side views showing the holder holding the disc cartridge having been rotated to its second position for loading the disc cartridge.

BEST MODE FOR CARRYING OUT THE INVENTION

The present invention is now explained with reference to an embodiment in which the invention is applied to a disc recording/reproducing apparatus in which the disc cartridge loading device of the present invention is applied to a disc recording/reproducing apparatus employing a magneto-optical disc capable of re-recording information signals as a recording medium.

Before proceeding to description of the loading device of the present invention, a disc cartridge loaded by this loading device is is explained.

Figure 1:
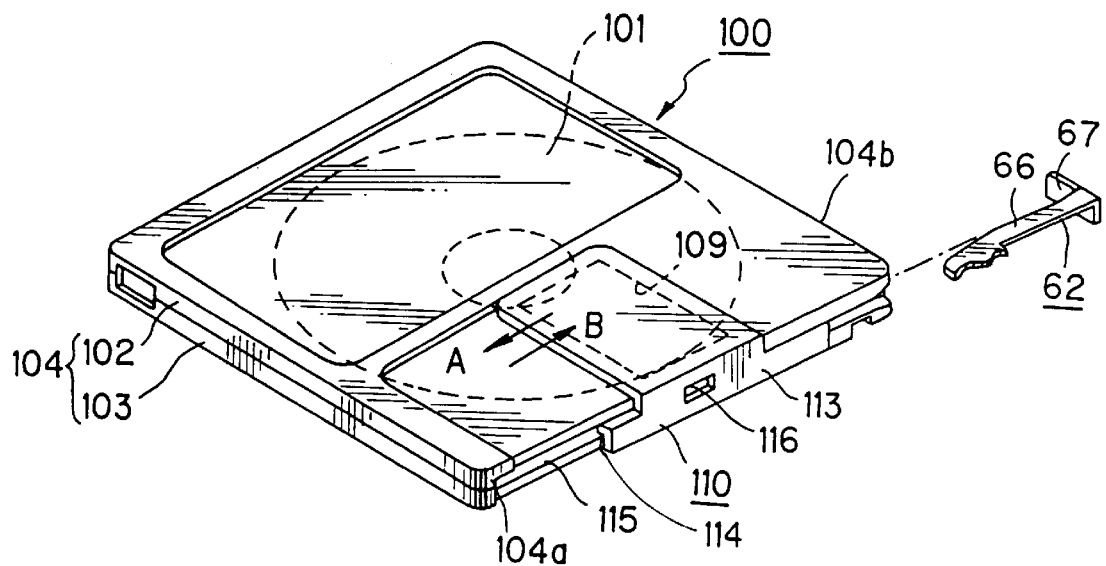
FIG. 1 is a perspective view of a first disc cartridge loaded by the disc cartridge loading device according to the present invention, as viewed from an upper surface side.
Figure 2:
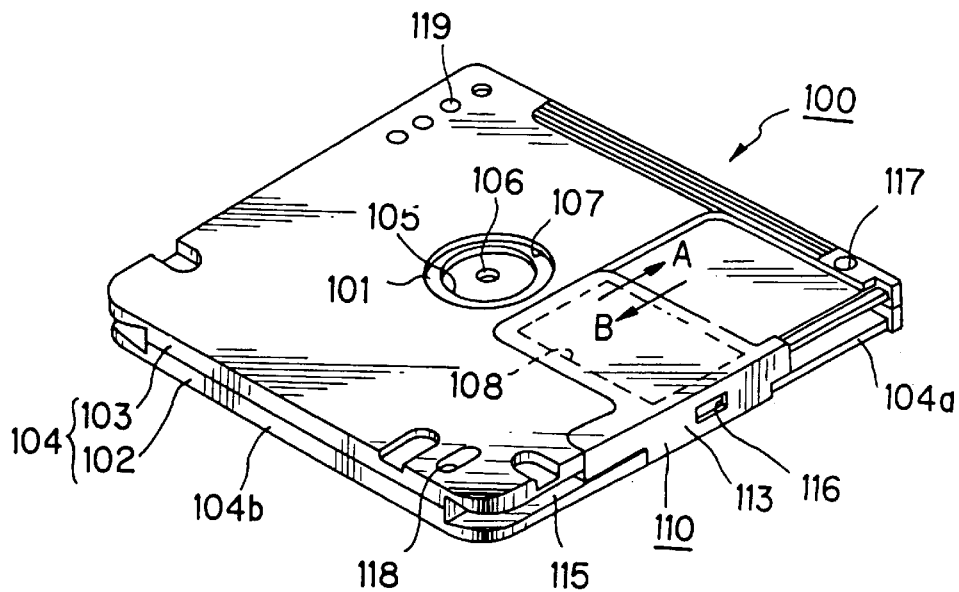
FIG. 2 is a perspective view showing the first disc cartridge, as viewed from the lower surface side.
Figure 3:
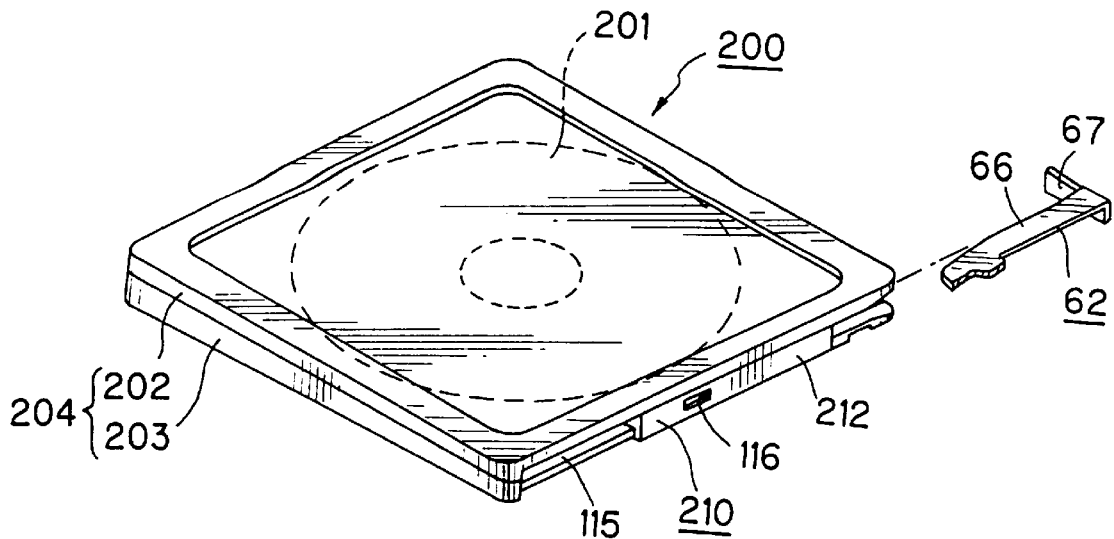
FIG. 3 is a perspective view showing the second disc cartridge, loaded by the disc cartridge loading device according to the present invention, as viewed from the upper surface side.
Figure 4:
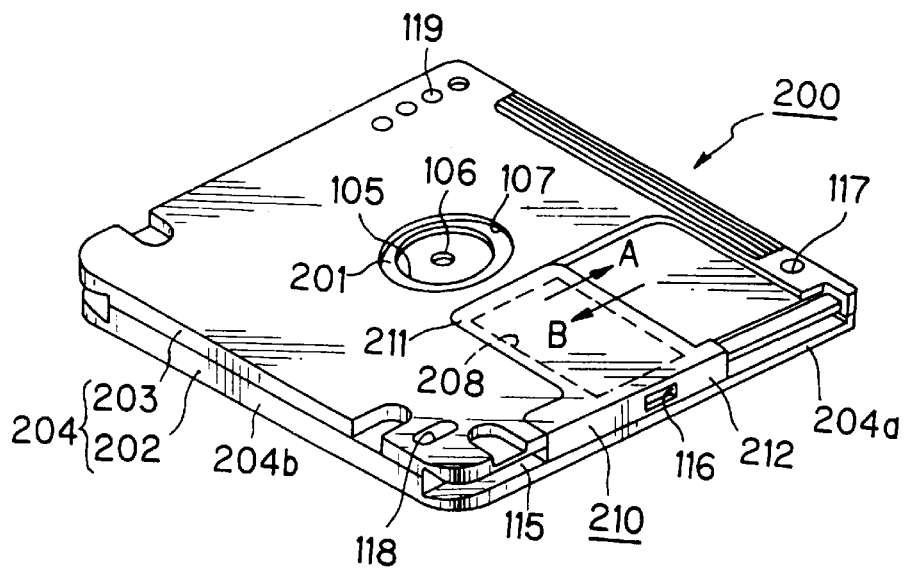
FIG. 4 is a perspective view showing the second disc cartridge, as viewed from the lower surface side.

The disc cartridge loaded by the loading device of the present invention encompasses a first disc cartridge 100 configured as shown in FIGS. 1 and 2 for housing a magneto-optical disc 101 capable of re-recording information signals, and a second disc cartridge 200 configured as shown in FIGS. 3 and 4 for housing a read-only optical disc 201 having information signals pre-recorded thereon and which is incapable of re-recording information signals.

The first disc cartridge 100, housing the magneto-optical disc 101, includes a main cartridge body portion 104 made up of an upper cartridge half 102 and a lower cartridge half 103 abutted and connected to each other, as shown in FIGS. 1 and 2. Within this main cartridge body portion 104 is rotatably mounted the magneto-optical disc 101 having a center hole 105 and a clamping plate 106 of a magnetic material, such as a clamping metal plate, for closing this center hole 105. The cartridge main body portion 104 includes a center opening 107 into which is intruded a disc table constituting a disc rotating unit provided on the disc recording/reproducing apparatus, a recording/reproducing aperture 108 faced by an optical pickup device and a recording aperture 109 into which is intruded a magnetic head. Referring to FIG. 2, the center opening 107 is formed at a mid portion on the lower surface of the main cartridge body portion 104 for exposing the center hole 105 of the magneto-optical disc 101 housed in the main cartridge body portion 104 and its rim portion to outside. The recording/reproducing aperture 108 is formed in the lower surface of the main cartridge body portion 104, as shown in FIG. 2, whilst the recording aperture 109 is formed in the upper surface of the cartridge main body portion 104, as shown in FIG. 1. These apertures 108, 109 facing each other, are rectangular in contour and are formed at a mid portion in the left-and-right direction of the main cartridge body portion 104 for extending from a position proximate to the center hole 105 towards a lateral side 104a of the main cartridge body portion 104.

On the main cartridge body portion 104 is movably mounted a shutter member 110 adapted for opening/closing the recording and/or reproducing aperture 108 and the recording aperture 109. The shutter 110, having generally a U-shaped cross-section, is made up of a first shutter plate 111 and a second shutter plate 112 facing each other and adapted for opening/closing the recording/reproducing aperture 108 and the recording aperture 109, respectively, and a connecting plate 113 interconnecting the base plate portions of the first and second shutter plates 111, 112. The shutter 110 is mounted on the main cartridge body portion 104 by fitting from the lateral side 104a, so that the recording aperture 109 and the recording/reproducing aperture 108 will be covered by these first and second shutter plates 111, 112 from outside. The connecting plate 113 of the shutter 110 is formed with a guide piece 114 formed by segmenting a portion of the connecting plate 113. This guide piece 114 is engaged in a groove 115 formed in the lateral surface 104a of the main cartridge body portion 104. The shutter 110 is moved along the lateral side 104a of the main cartridge body portion 104 in directions indicated by arrows A and B in FIGS. 1 and 2 for opening/closing the apertures 108, 109 with the guide piece 114 being guided in the guide groove. When the shutter 110 is in the position of closing the apertures 108, 109, it is locked by a lock member provided in the main cartridge body portion 104, not shown, for maintaining the closed state of the apertures 108, 109.

The first disc cartridge 100 is loaded on the disc recording/reproducing apparatus with the movement direction of the shutter 110 as the inserting/ejecting direction. That is, the first disc cartridge 100 is inserted into the disc recording/reproducing apparatus with the direction of arrow A of FIGS. 1 and 2 of opening the apertures 108, 109 by the shutter 110 as the inserting direction. Thus, the first disc cartridge 100 is inserted into the holder of the disc loading device with a front side 104b perpendicular to the lateral surface 104a parallel to the movement direction of the shutter 110 as an inserting end, as will be explained subsequently.

When the first disc cartridge 100 is inserted into the holder of the disc loading device, the locked state of the shutter by a shutter opening member intruded into a groove 115 formed along the lateral side 104a of the main cartridge body portion 104 is canceled, so that the shutter is moved in a direction of arrow A in FIGS. 1 and 2 for opening the apertures 108, 109.

Referring to FIGS. 1 and 2, the groove 115 is formed on the lateral surface 104a, by opening the front side 104b of the main cartridge body portion 104, for facilitating insertion of the shutter opening member in association with the operation of inserting the holder into the first disc cartridge 100.

In the connecting plate 113 of the shutter 110 is formed an engagement opening 116 adapted for being engaged by an opening holding piece adapted in turn for holding the shutter 110 in the opening position when the first disc cartridge 100 is inserted into the holder with the shutter 110 being then moved to a position of opening the apertures 108, 109.

In the lower surface of the cartridge main body portion 104 are formed positioning holes 117, 118 engaged by positioning pins provided on the cartridge loading section arranged on the disc recording/reproducing apparatus. These positioning holes 117, 118 are formed on both sides of the recording/reproducing aperture 108. The lower surface of the main cartridge body portion 104 is provided with an identification unit 119 for identifying the types or specifications of the disc housed within the main cartridge body portion 104.

Since the second disc cartridge 200, housing thereon a read-only optical disc 201, has the basic structure in common with the first disc cartridge 100, the parts or components common to those of the first disc cartridge are depicted by common numerals and detailed description therefor is omitted for simplicity.

Since the second disc cartridge 200 is exclusively is used for reproduction, there is no necessity of providing a recording aperture faced by the magnetic head used for recording information signals. The upper cartridge half 202, which proves to be an upper surface of the main cartridge body portion 204 when combined with the lower cartridge half 203, presents a planar surface devoid of an opening. Conversely, the lower cartridge half 203 is formed with a central opening 107 and a reproducing aperture faced by the optical pickup device, as in the case of the first disc cartridge 100.

In the second disc cartridge 200, the aperture 208 is formed only in the lower surface of the main cartridge body portion 204. Thus, a shutter 210 movably mounted on the main cartridge body portion 204 is provided only with a shutter plate 211 adapted for opening/closing the recording/reproducing aperture 208 formed in the lower surface of the main cartridge body portion 204. This shutter 210 is movably mounted on the main cartridge body portion 204 by having a movement guide portion 212 of a U-shaped cross-section formed on the proximal end of the shutter plate 211 inserted into a groove 115 formed in a lateral surface of the main cartridge body portion 204 and by clamping the lateral surface 204a of the main cartridge body portion 204 by this movement guide portion 212.

Similarly to the first disc cartridge 100, the second disc cartridge 200 is inserted into the holder of the disc loading device with the front surface 204b perpendicular to the lateral surface 204a parallel to the direction of shutter movement as an inserting end.

The loading device of the present invention is adapted for loading the first or second disc cartridges 100, 200 inserted into the holder with a direction parallel to the movement direction of the shutters 110, 210 as the inserting direction.

An example of application of the loading device for the disc cartridge according to the present invention to a disc recording/reproducing apparatus is hereinafter explained.

Figure 5:
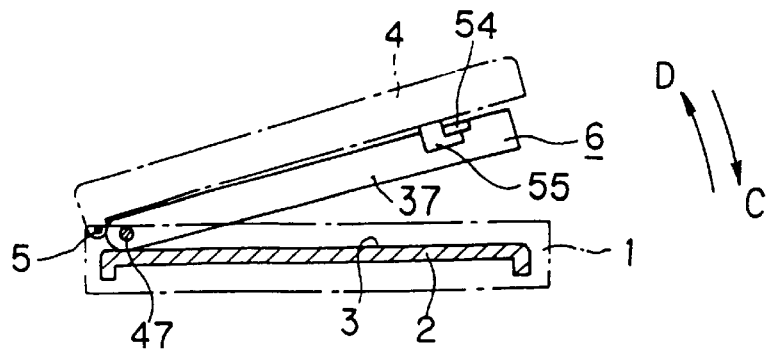
FIG. 5 is a schematic side view showing a disc recording/reproducing apparatus to which is applied the disc cartridge loading device according to the present invention.

Referring to FIG. 5, the disc recording/reproducing apparatus employing the loading device of the present invention includes a casing 1 constituting a main body portion and within which is mounted a base 2 carrying a disc rotating unit as later explained and a disc driving unit made up of a magnetic head device and an optical pickup device constituting recording and/or reproducing means for information signals. On the upper surface of the base 2 is arranged a cartridge loading section 3 for loading the first disc cartridge 100 or the second disc cartridge 200. A lid 4 for opening/closing the upper surface of the base 2 is mounted on the casing 1. This lid is rotatably mounted on the lid 1 by having both sides of its proximal end supported by a pivot shaft 5 on both sides of the back surface of the casing 1. On the inner surface of the lid 4 facing the base 2 is mounted a holder 6 in which is inserted and held the first disc cartridge 100 or the second disc cartridge 200 loaded on the cartridge loading section 3. This holder 6, constituting the loading device of the present invention, is mounted on the base 2 for rotation in synchronism with rotation of the lid 4.

Although not shown, a printed circuit board, carrying a control circuit for controlling the driving of the disc driving unit or a recording/reproducing circuit for processing information signals recorded on the magneto-optical disc 101 or information signals read out from the magneto-optical disc 101 or the optical disc 201, is mounted in the interior of the casing 1. The lid is also provided with, for example, a recording button, a playback button, a forward direction track jump button, a reverse direction track jump button, a pause button, a stop button or a volume adjustment button, for selecting the operating mode of the disc recording/reproducing apparatus. The lid 1 is also provided with a display section employing a liquid display device. On this display section is displayed the various information pertinent to the operating mode of the disc recording/reproducing apparatus.

Next, a loading device having a disc driving unit mounted on the base 2 and which is designed for loading the first and second disc cartridge 100 or 200 on the cartridge loading section 3 arranged on the base 2 for enabling information signals to be recorded and/or reproduced on or from the magneto-optical disc 101 or optical disc 201 housed within the disc cartridge 100 or 200, is specifically explained.

Figure 6:
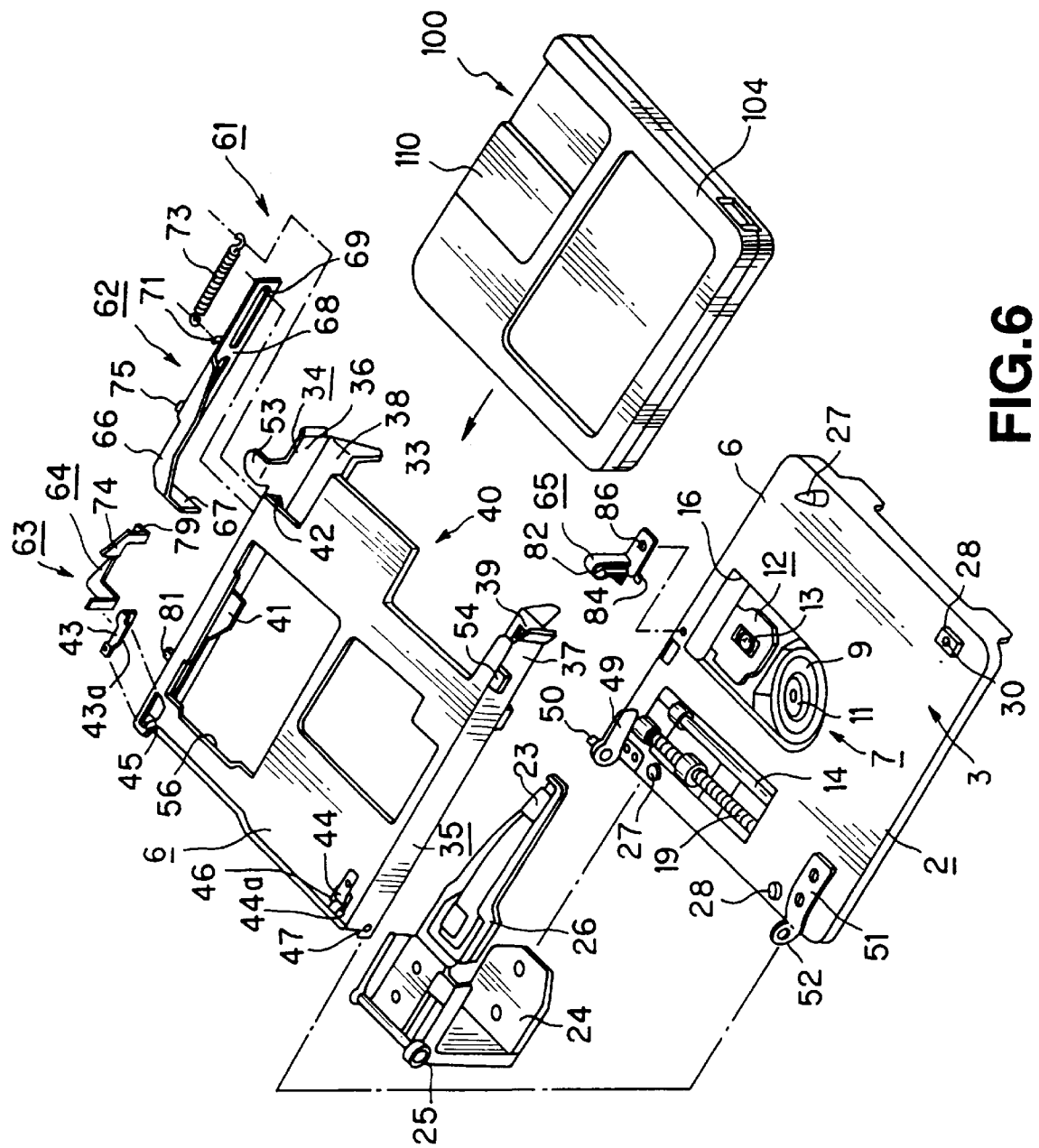
FIG. 6 is an exploded perspective view showing the disc cartridge loading device according to the present invention and a disc driving unit of the disc recording/reproducing apparatus employing the loading device.
Figure 7:
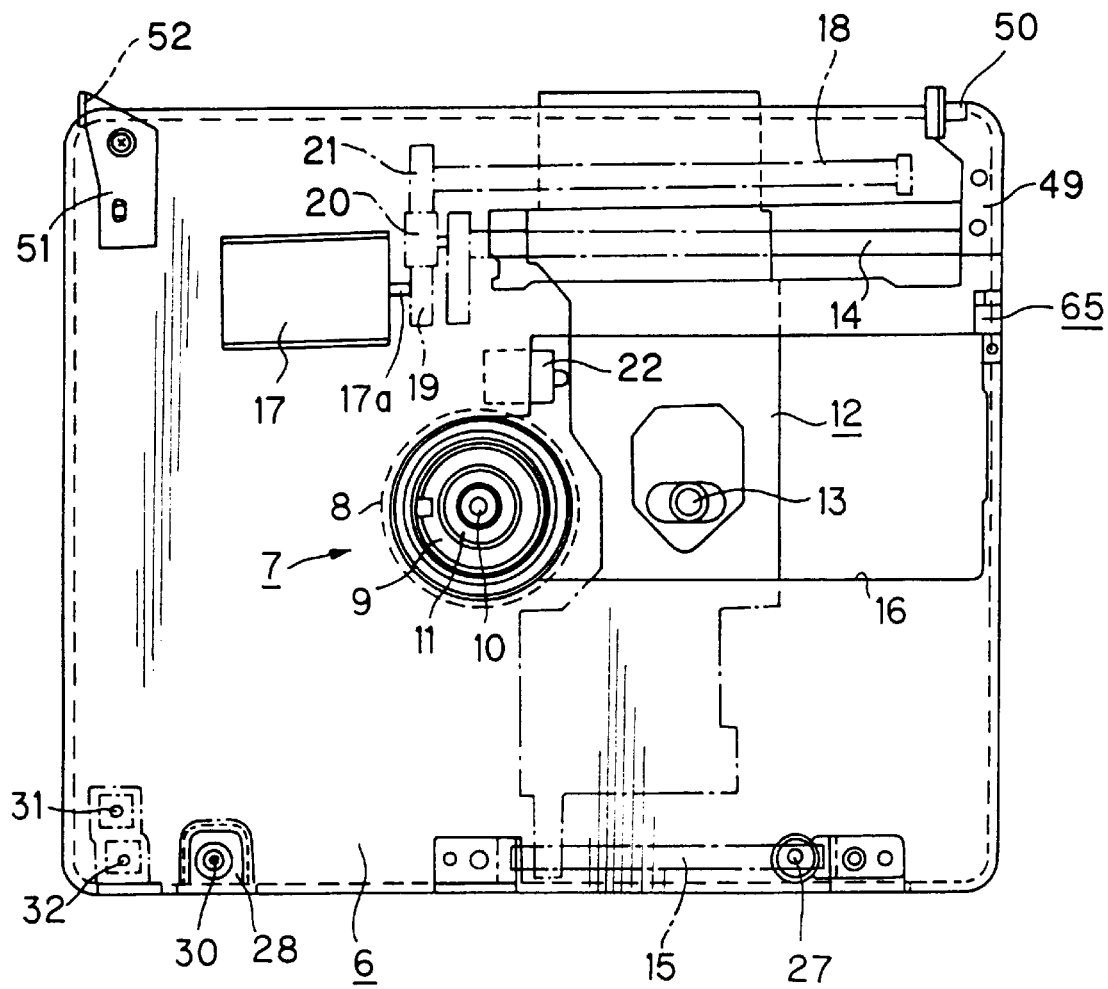
FIG. 7 is a plan view showing a disc driving unit of the disc recording/reproducing apparatus.

The base 2, mounted within the casing 1 for carrying the disc driving unit, is formed of metal in a rectangular shape, as shown in FIGS. 6 and 7. At a mid portion of the base 2 is arranged a disc rotating unit 7 for rotating a magneto-optical disc 101 or an optical disc 201 housed within the first disc cartridge 100 or within the second disc cartridge 200 loaded on the cartridge loading section 3, respectively. The disc rotating unit 7 includes a spindle motor 8 and a disc table 9 run in rotation by this spindle motor 8. This spindle motor is mounted on the lower surface of the base 2 by having a spindle shaft 10 protruded on the upper surface of the base 2 carrying the cartridge loading section 3. The disc table 9 is mounted on the distal end of the spindle shaft 10 for rotation in unison with the spindle shaft 10. At the mid portion of the disc table 9 is mounted a centering member 11 adapted for being engaged in the center opening 105 of the magneto-optical disc 101 or the optical disc 201 so that the magneto-optical disc 101 or the optical disc 201 will be correctly centered and loaded on the disc table 9. The disc table 9 is provided with a magnet for magnetically attracting the clamping plate 106 for rotating the magneto-optical disc 101 or an optical disc 201 as one with the disc table 9.

On the base 2 is mounted an optical pickup device 12 of recording/reproducing means for recording/reproducing information signals on or from the magneto-optical disc 101 or the optical disc 201 clamped on the disc table 9 for being rotated by the disc rotating unit 7.

The optical pickup device 12 includes, as main components, the semiconductor laser radiating a light beam, an objective lens for converging the light beam radiated from the semiconductor laser and illuminating the converged light beam on the optical disc 201 and a photodetector for detecting the return light reflected from the magneto-optical disc 101 or the optical disc 201 for detecting the information signals or the control signal.

Referring to FIG. 7, the optical pickup device 12 has its both sides supported by a pair of guide shafts 14, 15 mounted parallel to each other on the lower surface of the base 2 so that the optical pickup device can be moved radially of the magneto-optical disc 101 or the optical disc 201 set on the disc table 9. At this time, the objective lens faces the upper surface of the base 2 via a cut-out 16 for facing the magneto-optical disc 101 or the optical disc 201 set on the disc table 9. The optical pickup device 12 is fed radially of the magneto-optical disc 101 or the optical disc 201 set on the disc table 9 by a feed screw 18 as the optical pickup device 12 is guided by guide shafts 14, 15. The feed screw 18 is adapted for being rotated by a feed motor 17 mounted on the lower surface of the base 2. The feed screw 18 is mounted on the base 2 parallel to the guide shafts 14, 15 and is connected to the feed motor 17 via a driving gear 19, a speed-reducing gearing 20 and a coupling gear 21 mounted on an output shaft 17a of the feed motor 17.

The base 2 is fitted with an initial position detection switch 22 adapted for detecting that the optical pickup device 12 fed by the feed motor 17 has reached the initial position. When the optical pickup device 12 has been fed as far as the initial position on the innermost rim of the magneto-optical disc 101 or the optical disc 201 on the disc table 9, the initial position detection switch 22 controls the driving of the feed motor 17 so that the driving of the feed motor 17 is halted momentarily and then feeds the optical pickup device 12 from the innermost rim towards the outer periphery of the magneto-optical disc 101 or the optical disc 201 responsive to the operating mode of the disc recording/reproducing apparatus. The initial position detection switch 22 is provided at a position proximate to the spindle motor 8 for detecting that the optical pickup device 12 has been fed as far as the initial position on the innermost rim of the magneto-optical disc 101 or the optical disc 201, as shown in FIG. 7.

To the optical pickup device 12, thus fed by the feed motor 17, is coupled a magnetic head 23 adapted for recording information signals on the magneto-optical disc 101 in cooperation with the optical pickup device 12. This magnetic head 23 is mounted, via pivot shaft 25, on the distal end of a head supporting arm 26 coupled to the optical pickup device 12, so that the magnetic head will be moved in synchronism with the optical pickup device 12, as shown in FIG. 6.

The coupling arm 24 is substantially L-shaped and is mounted by having its proximal end secured to the optical pickup device 12 so that its distal end is protruded on the upper surface of the base 2. The head supporting arm 26 has its proximal end supported via pivot 25 on the distal end of the connecting arm 24 and is extended on the upper surface of the base 2 so that the magnetic head 23 mounted on the distal end of the head supporting arm 26 will face the objective lens 13 of the optical pickup device 12. By the head supporting arm 26 being rotated about pivot shaft 25, the magnetic head 23 is moved towards or away from the magneto-optical disc 101 or the optical disc 201 clamped on the disc table 9. Meanwhile, the head supporting arm 26 is rotated about pivot shaft 25 as center, in operative association with rotation of the lid 4, for moving the magnetic head 23 to a position spaced apart from the base 2 when the lid 4 is opened.

The disc driving unit, comprised of the disc rotating unit 7, optical pickup device 12 and the magnetic head 23 assembled on the base 2, rotates the magneto-optical disc 101 or the optical disc 201 clamped on the disc table 9, and scans the signal recording surface of the magneto-optical disc 101 or the optical disc 201 with a light beam radiated from the processing device 12 fed by the feed motor 17 for reproducing the information signals recorded on the disc 101 or 201. At this time, the head supporting arm 26 is rotated about the pivot shaft 25 as center so that the magnetic head 23 is held at a position spaced apart from the disc 101 or 201.

A light beam is radiated from the optical pickup device 12 to the disc 101 or 201 rotated as it is clamped on the disc table 9, at the same time as the head supporting arm 26 is rotated about the pivot shaft 25 as center for moving the magnetic head 23 towards the magneto-optical disc 101 for impressing an external magnetic field corresponding to the information signals to be recorded by the magnetic head 23 for recording the information signals on the magneto-optical disc 101.

On the upper surface of the base 2, in which is assembled the disc driving unit, there is mounted a cartridge loading section 3 for loading thereon the first disc cartridge 100 housing the magneto-optical disc 101 rotated by the disc rotating unit 7 or the second disc cartridge 200 housing the optical disc 201. This cartridge loading section 3 is provided with a pair of positioning pins 27, 27 and a pair of height setting pins 28, 28 for setting the loading positions of the first and second disc cartridges 100, 200 loaded on the disc recording/reproducing apparatus. The first or second disc cartridges 100, 200 is loaded on the cartridge loading section 3 in position in both the horizontal and vertical directions by having the positioning pins 27, 27 engaged in the positioning holes 117, 118 and by having the lower sides supported by the height setting pins 28, 28.

At a mid portion of one of the positioning projections 28 is mounted a cartridge loading detection switch 30 for detecting that the first disc cartridge 100 or the second disc cartridge 200 has been loaded on the cartridge loading section 3. When the first disc cartridge 100 or the second disc cartridge 200 has been loaded on the cartridge loading section 3, the cartridge loading detection switch 30 has its operator thrust by the lower surface of the cartridge main body portion 104 or 204 for detecting loading of the disc cartridge 100 or 200. On the upper surface of the base, there is provided, near the cartridge loading detection switch 30, cartridge type identification switches 31, 32 for detecting the identification unit 119 provided on the first disc cartridge 1 00 or the second disc cartridge 200 loaded on the cartridge loading section 3 for detecting the type of the loaded disc cartridge or the specifications of the disc housed within this disc cartridge, as shown in FIG. 7.

The loading device for loading the first disc cartridge 100 or the second disc cartridge 200 on the cartridge loading section 3 formed on the upper surface of the base 2, according to the present invention, is hereinafter explained.

Figure 8:
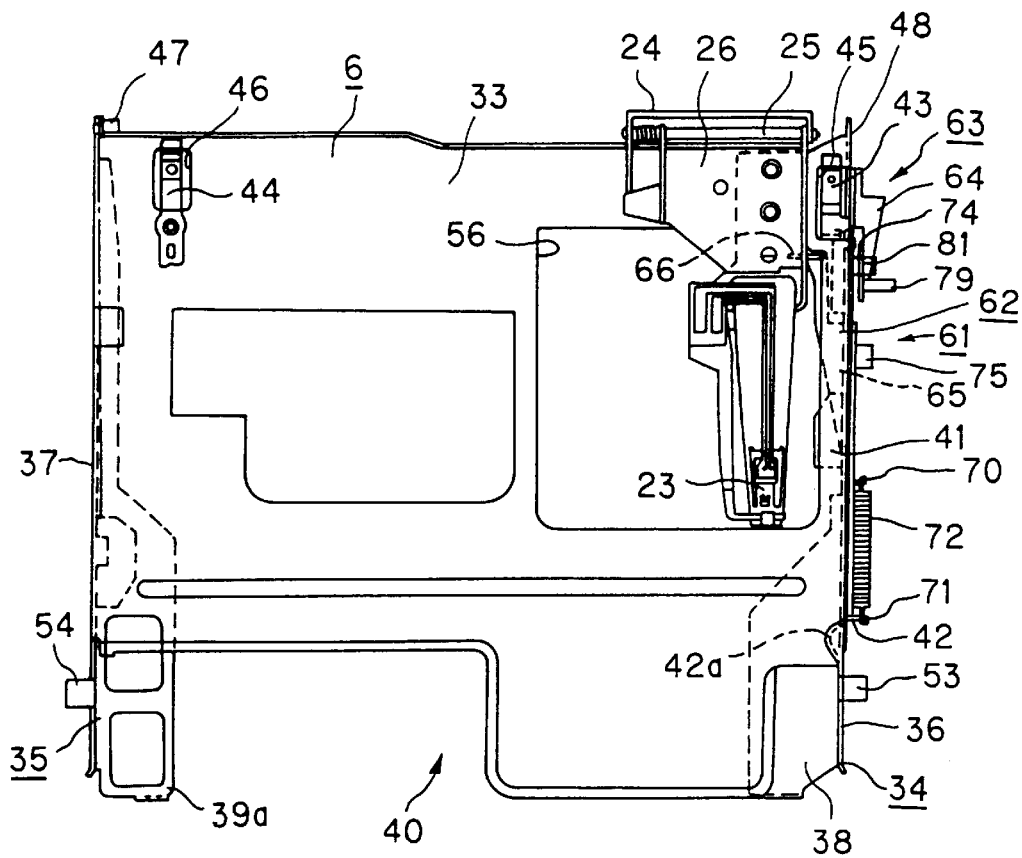
FIG. 8 is a plan view showing a holder and a holding mechanism constituting the loading device according to the present invention.

The loading device according to the present invention includes a holder 6 in which the first disc cartridge 100 or the second disc cartridge 200 to be loaded on the cartridge loading section 3 is inserted and held. As shown in FIG. 5, this holder 6 is arranged on the inner surface side of the lid 4 facing the base 2 and, as shown in FIGS. 6 and 8, has a substantially quadrilateral plate-shaped portion 33, on opposite facing sides of which are provided paired cartridge supporting portions 34, 35 for supporting both facing sides of the inserted first disc cartridge 100 or the second disc cartridge 200. These cartridge supporting portions 34, 35 are sidewall sections 36, 37 depending on both sides of the plate-shaped portion 33 and cartridge supporting pieces 38, 39 formed by warping the distal ends of the sidewall sections 36, 37 in a direction substantially parallel to the plate-shaped portion 33 and generally present a cross-section in the form of a letter U. The holder 6 has its front-side opening portion, corresponding to a side of the plate-shaped portion 33 perpendicular to its side provided with the cartridge supporting portions 34, 35, as a cartridge entrance/exit opening 40.

The holder 6 is formed by punching and warping a metal plate.

The first disc cartridge 100 or the second disc cartridge 200 is inserted into a spacing between the cartridge supporting portions 34, 35, via cartridge entrance/exit opening 40, with the front sides 104b, 204b as inserting ends. When the first disc cartridge 100 or the second disc cartridge 200 has been inserted and held at a position of completion of insertion into the holder 6, the central opening 107, recording/reproducing aperture 108 or recording aperture 208, positioning holes 117, 118 and the identification unit 119 face the cartridge loading section 3 via the spacing between the cartridge supporting portions 34, 35.

On a mid portion of the sidewall section 36 of the holder 6, into which is inserted and held the first disc cartridge 100 or the second disc cartridge 200, there is protuberantly formed a shutter opening operating piece 41 for extending towards the inner part of the holder 6. When the first disc cartridge 100 or the second disc cartridge 200 is inserted into the holder 6, the shutter opening operating piece 41 is intruded into the groove 115 formed in the lateral side 104a or 204a of the cartridge main body portion 104 or 204 for thrusting the lock member for unlocking the shutter 110 or 210, at the same time as it compresses against the shutter 110 or 210 to shift the shutter 110 or 210 relative to the main cartridge body portion 104 or 204 for opening the apertures 108, 109 or 208.

On the sidewall section 36 is mounted a shutter holding member 42 engaged with the engagement opening 116 formed in the shutter 110 or 210 of the disc cartridge 100 or 100 inserted into the holder 6 for holding the shutter 110 or 210 at the opened position. This shutter holding member 42 is constituted by a flexible spring plate and, as shown in FIGS. 6 and 8, includes an engagement lug 42a at its distal end for engaging in the engagement opening 116 formed in the shutter 110 or 210. This shutter holding member 42 has its proximal end secured to the sidewall section 36 so that the engagement lug 42a is protruded towards the inner part of the holder 6. The shutter holding member 42 is mounted on the sidewall section 36 with the engagement lug 42a positioned towards the cartridge entrance/exit opening 40 beyond the site of the shutter opening piece 41.

The shutter holding member 42, holding the shutter 110 or 210 of the disc cartridge 100 or 200 inserted into the holder 6 in its opening position, shifts the shutter 110 or 210 relative to the main cartridge body portion 104 or 204 when ejecting the disc cartridge 100 or 200 from the holder 6, thus moving the shutter 110 or 210 to the position of closing the opening 108, 109 or 208.

The plate-shaped portion 33 of the holder 6 carries a pair of thrusting springs 43, 44 for thrustingly supporting the first or second disc cartridge 100 or 200 inserted into the holder 6 for holding the disc cartridge in the holder 6. These thrusting springs 43, 44 are mounted on both sides of the proximal end of the plate-shaped portion 33 facing the front side formed with the cartridge entrance/exit opening 40, as shown in FIGS. 6 and 8. Each thrusting spring 43, 44 is mounted on the upper surface of the plate-shaped portion 33 so that a lug 43a or 44a formed on its distal end is protruded into the inside of the holder 6 via cut-outs 45, 46 formed in the plate-shaped portion 33.

Each thrusting spring 43, 44 compresses against the upper surface of the first or second disc cartridge 100 or 200 inserted into the holder 6 for bringing the first or second disc cartridge 100 or 200 into pressure contact with the positioning pins 27, 27 and the height setting pins 28, 28 provided on the cartridge loading section 3.

On both sides of the proximal end of the holder opposite to its front side formed with the cartridge entrance/exit opening 40, a pivot shaft 47 and a pivot shaft inserting opening 48 are formed for rotatably supporting the holder 6 on the base 2. The pivot shaft inserting opening 48 is bored in the proximal end of the sidewall section 36, whilst the pivot shaft 47 is formed on the proximal end of the opposite sidewall section 37 for projecting towards the inner part of the holder 6. The holder 6 is supported for rotation about the pivot shafts 47, 50 as the center of rotation by passing the pivot shaft 50 provided on a first rotation supporting plate 49 provided in turn on one side on the back surface of the base 2 into the shaft inserting hole 48 and by passing the pivot shaft 47 through a shaft-inserting opening 52 bored in a second rotation supporting plate 51 provided on the opposite side of the base 2. That is, the holder 6 is supported about the pivot shafts 47, 50 as the center of rotation in a direction indicated by arrow C and in a direction indicated by arrow D in FIG. 5 between a first position spaced apart from the cartridge loading section 3 to permit insertion or ejection of the first or second disc cartridge 100 or 200 and a second position lowered from the first position to permit the first or second disc cartridge 100 or 200 inserted into and held by the holder 6 to be loaded on the cartridge loading section 3.

The holder 6, arranged on the inner surface of the lid 4, is rotated in synchronism with rotation of the lid 4 by engaging engagement pieces 53, 54 provided on both sides on the front face side of the holder formed with the cartridge entrance/exit opening 40 with mating engagement pieces 55 provided on the lid 4. That is, the holder 6 is rotated, along with the lid 4, between the first and second positions, by rotation of the lid 4 in the directions indicated by arrow C or D in FIG. 5.

Meanwhile, the plate-shaped portion 33 of the holder 6 is formed with an opening 56 through which the magnetic head 23 carried on the distal end of the head supporting arm 26 extended on the holder 6 is intruded into the holder 6. The head supporting arm 26, extended over the upper surface of the holder 6, is rotated about the pivot shaft 25 as center in association with rotation of the holder 6.

The holder 6 is provided with an ejection lever 62 for ejecting the first or second disc cartridge 100 or 200, inserted and held in the holder 6, as shown in FIG. 6.

Between the holder 6 and the base 2, there is provided a holding unit 63 for holding the ejection lever 62 moved by the first or second disc cartridge 100 or 200 inserted into the holder 6 and for locking the holder 6 rotated to the second position of loading the first or second disc cartridge 100 or 200 in this second position. When the holder 6 is rotated about the pivot shafts 47, 50 in the direction of arrow D in FIG. 5 proceeding from the second position to the first position, the holding unit 63 unlocks the holder 6 while releasing the holding on the ejection lever 62. Specifically, the holding unit 63 includes a holding member 64 for holding the ejection lever 62 and a lock member 65 making up a lock unit adapted for engaging with the holding member 64 for locking the holder 6 in the second position when the holder 6 is in the second position. The holding member 64 is mounted on the holder 6, as shown in FIG. 6, while the lock member 65 is mounted on the base 2, as also shown in FIG. 6.

Figure 9:
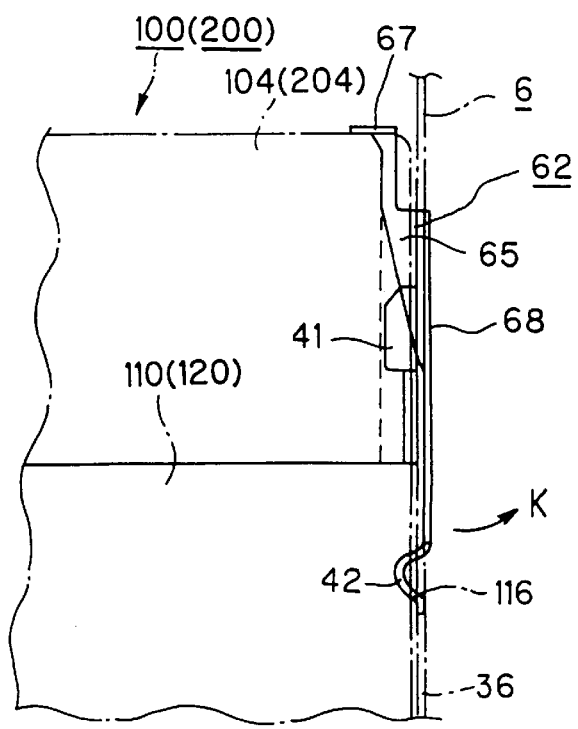
FIG. 9 is a partial plan view showing the disc cartridge inserted into the holder.

The ejection lever 62, adapted for ejecting from the holder 6 the first or second disc cartridge 100 or 200, inserted and held in the holder 6, includes an insertion piece 66 inserted into a groove 115 formed in the lateral side 104a or 204a of the first or second disc cartridge 100 or 200, inserted and held in the holder 6, and an abutment piece 67 compressing against the front side 104b or 204b as the inserting end of the first or second disc cartridge 100 or 200, inserted and held in the holder 6, as shown in FIG. 6. The inserting piece 66 is formed by folding a lateral side of a main lever body portion 68 in the shape of a letter L, while the abutment piece 67 is formed by folding the distal end of the main lever body portion 68 in the shape of a letter U. The ejection lever 62 is arranged on the outer lateral side of the sidewall section 36 by inserting the inserting piece 66 and the abutment piece 67 into the inside of the holder 6 via a cut-out opening, not shown, provided in the sidewall section 36 of the holder 6, as shown in FIG. 9. The ejection lever 62 is mounted so that, at this time, the paired supporting pins 70, 70 set on the outer lateral side of the sidewall section 36 are passed through paired elongated openings 69, 69 formed in the main lever body portion 68 and which have the long axes coincident with the longitudinal direction of the main lever body portion 68, as shown in FIG. 10, so that the ejection lever is movable in the directions of arrows E and F in FIG. 10 within the extent of the elongated openings 69, 69 under guidance by the supporting pins 70, 70.

Figure 10:
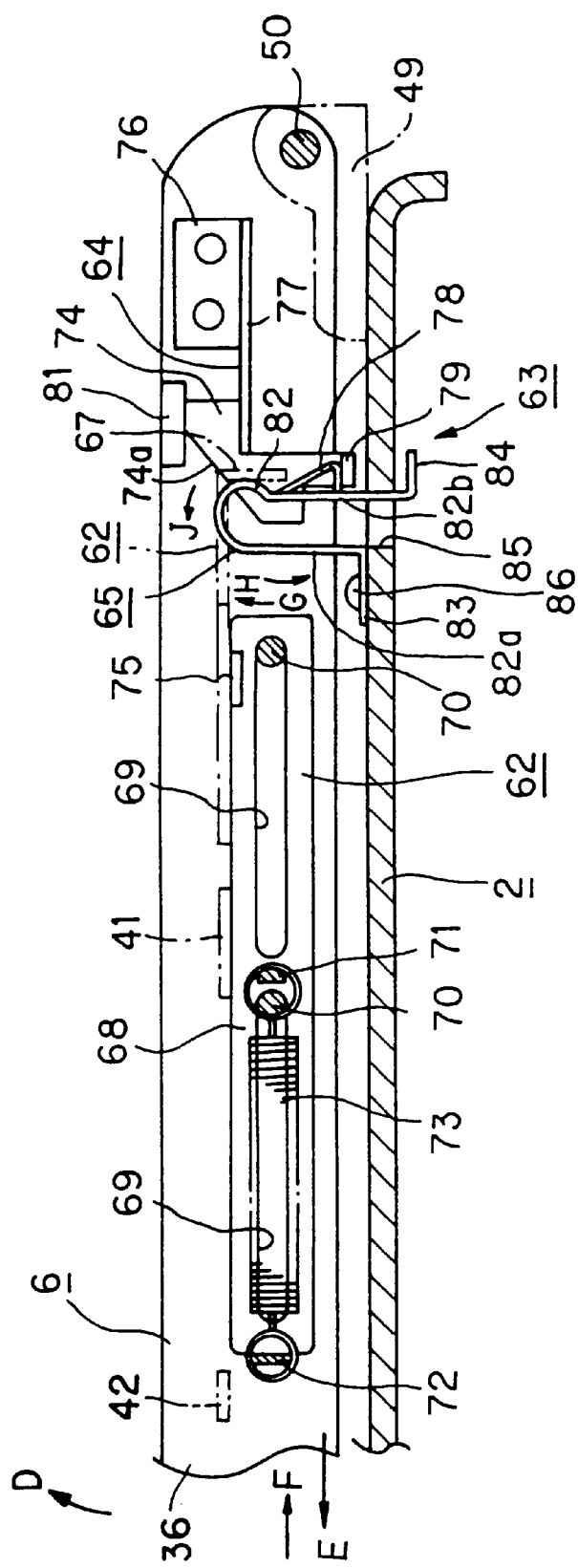
FIG. 10 is a plan view showing the holder rotated to its second position without holding the disc cartridge.

The ejection lever 62 is biased towards the cartridge entrance/exit opening 40 of the holder 6, as indicated by arrow E in FIG. 10, by a tension spring 73 installed under tension between a spring retainer 71 provided at a mid portion of the main lever body portion 68 and another spring retainer 72 provided on the sidewall section 36 of the holder 6. At this time, the insertion piece 66 provided on the ejection lever 62 is positioned towards the rear side of the shutter opening piece 41 provided on the holder 6. The insertion piece 66 is intruded into the inside of the holder 6 an amount approximately equal to the amount of protrusion of the shutter opening piece 41.

On the main lever body portion 68 of the ejection lever 62 is mounted an engagement piece 75 engaged with a holding piece 74 mounted as a holding portion on the holding member 64.

When the first or second disc cartridge 100 or 200 is inserted into the holder 6 via cartridge entrance/exit opening 40 into the holder 6, the abutment piece 67 is thrust by the front side 104b, 204b of the disc cartridge 100 or 200. This shifts the ejection lever 62 mounted on the holder 6 ejection lever 62, mounted on the holder 6, towards the rear of the holder 6 as indicated by arrow F in FIG. 10, against the bias of the tension spring 73. When the first or second disc cartridge 100 or 200 is inserted into the holder 6 to the insertion end position, the engagement piece 75 is engaged with the holding piece 74 of the holding member 64, thus holding the ejection lever 62 in a state of not biasing the disc cartridge 100 or 200 by the tension spring 73.

The holding member 64, holding the ejection lever 62 moved by the inserted first or second disc cartridge 100 or 200, is connected to a thrusting spring 43 mounted on the plate-shaped portion 33 of the holder 6 and which is adapted for thrustingly supporting the first or second disc cartridge 100 or 200 inserted into the holder 6 as shown in FIG. 6. Specifically, the holding member 6 is formed of a spring plate as one with the thrusting spring 43.

The connecting portion of the holding member 64 to the thrusting spring 43 is provided with a mounting piece 76 warped in a direction at right angles with the thrusting spring 43, and an elastic displacement piece 77 is mounted by warping the mounting piece 76 in a direction at right angles with the mounting piece 76. The distal end of the elastic displacement piece 77 has a holding piece 74 engaged with the engagement piece 75 provided on the ejection lever 62. An engagement piece 79 adapted for engaging with a lock pawl 78 is provided on the lock member 65 mounted on the base 2 so as to depend from one end of the holding piece 74.

The holding member 64 is mounted on the holder 6 by securing the mounting piece 76 on the outer side of the sidewall section 36 of the holder 6 so that the elastic displacement piece 77 will be elastically displaced in a direction at right angle with the direction of insertion/disengagement of the first or second disc cartridge 100 or 200 with respect to the holder 6, that is in a direction indicated by arrow G or H in FIG. 10.

The distal end side of the holding piece 74 is formed with an inclined surface 74a on which the engagement piece 75 of the ejection lever 62 rides when the engagement piece 75 is progressively engaged with the holding piece 74 for elastically displacing the elastic displacement piece 77 in a direction indicated by arrow G in FIG. 10.

The sidewall section 36 of the holder 6 is formed with a control piece 81 for compressing against the distal end side of the holding piece 74 of the holding member 64 for controlling the elastic displacement of the holding member 64 in the direction indicated by arrow H in FIG. 10.

The lock member 65 constituting the lock unit for locking the holder 6 in the second position includes an elastic displacement portion 82 warped substantially in the shape of a letter U, as shown in FIGS. 6 and 10. This elastic displacement portion 82 is made up of paired pieces 82a, 82b, of which the piece 82a has its proximal end fitted with a mounting piece 83 and the piece 82b has its distal end formed with a retainer 84 for the base 3, as shown in FIG. 6. The mid portion of the piece 82b is formed with a lock pawl 78 extending to outside. The lock pawl 78 is warped to a triangular cross-sectional shape by segmenting and bending a mid portion of the piece 82b. The lock member 65 is arranged on the upper surface of the base 2 by having the lock pawl 78 face the holding member mounted on the holder 6 and by having the retainer 84 inserted through an engagement hole 85 bored in the base 2 so as to be retained by the lower surface of the base 2, and is mounted on the base by securing the mounting piece 83 in position by a set screw 86.

The lock member 65 thus mounted on the base 2 is held in the second position by engaging the engagement piece 79 provided on the holding member 64 in the lock pawl 78 when the holder 6 has been rotated to the second position proximate to the cartridge loading section 3, as shown in FIGS. 10 or 14.

The operation of loading the first or second disc cartridge 100 or 200 in the disc recording/reproducing apparatus having the above-described disc cartridge loading device is hereinafter explained.

If, with the disc recording/reproducing apparatus of the present invention, the first or second disc cartridge 100 or 200 is not inserted into the holder 6, the lid 4 is rotated in the direction of arrow C in FIG. 5 and the holder 6 has been rotated along with the lid 4 to the second position proximate to the cartridge loading section 3 shown in FIG. 10, the driving of the disc driving unit is controlled because the disc cartridge 100 or 200 is not detected by the cartridge loading detection switch 30. That is, with the present disc recording/reproducing apparatus, input to the operating mode of recording and/or reproduction of information signals is controlled even if the lid 4 is closed without the disc cartridge 100 or 200 being introduced into the holder 6.

If the first or second disc cartridge 100 or 200 is not inserted A into the holder 6, the ejection lever 62 is moved in a direction indicated by arrow E in FIG. 10, under the bias of the tension spring 73, so as to be positioned proximate to the cartridge entrance/exit opening 40. On the other hand, if the holder 6 has been rotated to its second position, the engagement piece 79 provided on the holding member 64 is engaged with the lock pawl 78 and is thereby held in the second position. This imposes limitations on the inadvertent opening of the holder 6.

Figure 11:
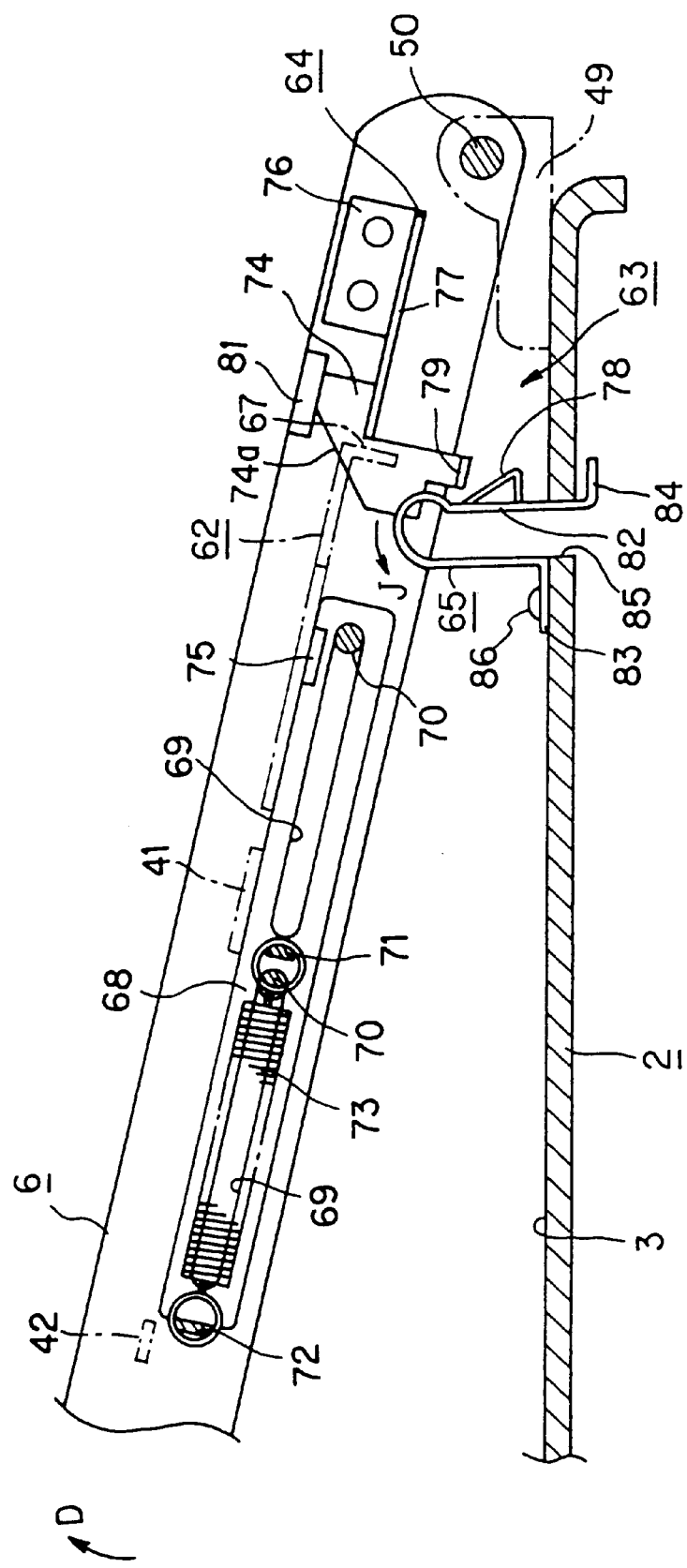
FIG. 11 is a side view showing the holder rotated to its first position.

For loading the first or second disc cartridge 100 or 200 on the cartridge loading section 3 on the base 2, the holder 6 is rotated, along with the lid 4, to the first position displaced from the cartridge loading section 3 shown in FIG. 11, as indicated by arrow D in FIGS. 5 and 10, about the pivot shafts 47, 50 as the center of rotation, so that the cartridge entrance/exit opening 40 will face outwards. If the holder 6 has been rotated in the direction of arrow D in FIG. 10, the elastic displacement portion 82 of the lock member 65 is elastically displaced in the direction of arrow J in FIG. 11, by the engagement piece 79 provided on the holding member 64 engaged with the lock pawl 78, thus canceling the lock of the holder by the lock member 65.

With the cartridge entrance/exit opening 40 facing outwards, the first or second disc cartridge 100 or 200 is inserted via cartridge entrance/exit opening 40 into the holder 6, with the front side 104b, 204b of the first or second disc cartridge 100 or 200 as the inserting side. At this time, first or second disc cartridge 100 or 200 is inserted into the holder 6 as the shutter holding member 42 is elastically displaced in a direction towards outside of the holder 6 as indicated by arrow K in FIG. 9. If the shutter holding member 42 is further introduced into the holder 6, the shutter opening piece 41 is intruded into the groove 115 formed in the lateral surface 104b, 204b of the main cartridge body portion 104 or 204 to thrust the lock member to unlock the shutter 110 or 210. At this time, the shutter holding member 42 is engaged with the engagement hole 116 to control the movement of the shutter 110 or 210. If the first or second disc cartridge 100 or 200 is further inserted into the holder 6, the shutter 110 or 210 is moved in a direction indicated by arrow A in FIGS. 1, 2 and 4 relative to the cartridge main body portion 104 or 204 as far as a position of opening the aperture 108, 109 or 208.

If the first or second disc cartridge 100 or 200 has been inserted into the holder 6 to the position in which the shutter 110 or 210 opens the aperture 108, 109 or 208, the inserting piece 66 provided on the ejection lever 62 is intruded into the groove 115 formed in the cartridge main body portion 104 or 204. If the first or second disc cartridge 100 or 200 is further inserted into the holder 6, the front surface 104b or 204b of the main cartridge body portion 104 or 204 compresses against the abutment piece 67 provided on the distal end of the ejection lever 62, as shown in FIGS. 12A and B.

If the first or second disc cartridge 100 or 200 is further inserted from this point into the holder 6 in a direction indicated by arrow L in FIG. 12B, the ejection lever 62 has its abutment piece 67 thrust by the first or second disc cartridge 100 or 200. Thus, the ejection lever 62 is moved in the direction of arrow L in FIG. 12B, against the bias of the tension spring 73, with the elongated holes 69, 69 being guided by the supporting pins 70, 70 set upright on the sidewall section 36 of the holder 36.

If, with the abutment piece 67 compressing against the front surface 104b or 204b of the main cartridge body portion 104 or 204, the first or second disc cartridge 100 or 200 is further inserted into the inside of the holder 6, the ejection lever 62 is moved in the direction of arrow L in FIG. 12B, in unison with the first or second disc cartridge 100 or 200, against the bias of the tension spring 73, such that the engagement piece rides on the inclined surface 74a of the holding piece 74 for elastically displacing the elastic displacement piece 77 to cause displacement of the holding piece 74 in the direction shown by arrow G in FIG. 12A. If the first or second disc cartridge 100 or 200 is inserted to the insertion end position into the holder 6, the engagement piece 75 is disengaged from the holding piece 74 to permit elastic restoration of the elastic displacement piece 77 to move the retainer 74 in a direction shown by arrow H in FIG. 13A for engaging the engagement piece 75 with the holding piece 74.

When the ejection lever 62 is moved by being thrust by the first or second disc cartridge 100 or 200, the inserting piece 66 has been inserted into the groove 15. Thus, the ejection lever 62 is positively moved as-one with the first or second disc cartridge 100 or 200, against the bias of the tension spring 73, in the direction of inserting the first or second disc cartridge 100 or 200 into the holder 6, without undergoing rotational displacement.

Figures 13A, 13B:
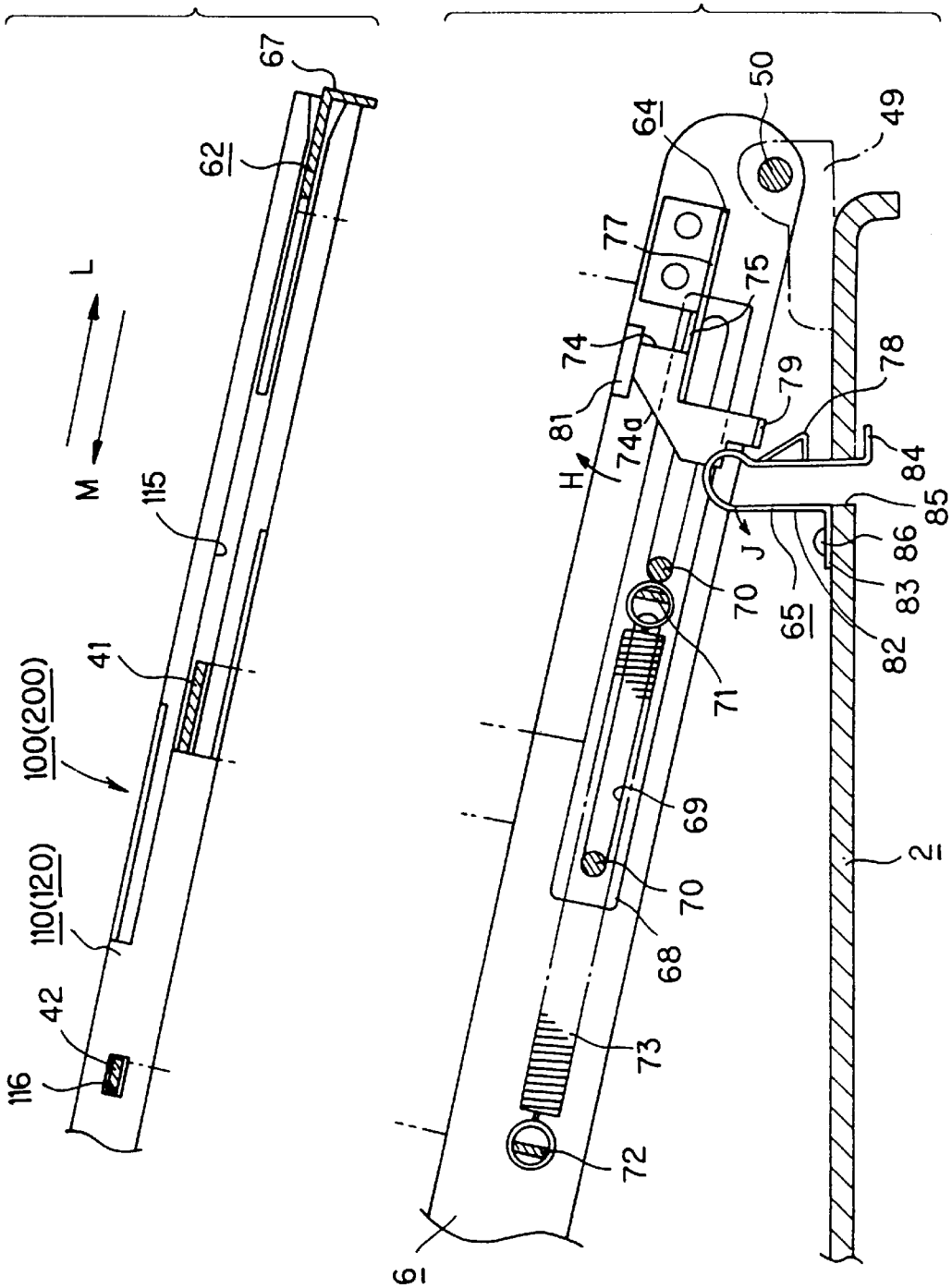
FIGS. 13A and B are side views showing the disc cartridge insert to its fully inserted position in the holder and also showing the ejection lever held by the holding mechanism.

When the first or second disc cartridge 100 or 200 has been inserted into the holder as far as the insertion end position, as shown in FIG. 13B, the ejection lever 62 has the engagement piece 75 engaged with the holding piece 74 of the holding member 64 and is held in a state in which the tension spring 73 is extended without loading the first or second disc cartridge 100 or 200 inserted into the holder 6.

The operation of loading the first or second disc cartridge 100 or 200 inserted and held in the holder 6 then is carried out.

For loading the first or second disc cartridge 100 or 200 on the cartridge loading section 3, the first or second disc cartridge 100 or 200 is inserted into the holder 6 to the insertion end position for having the ejection lever 62 held by the holding member 64. The holder 6 is then rotated along with the lid 4 in the direction of arrow C in FIGS. 5 and 13A about the pivot shafts 47, 50 as the center of rotation. When the holder 6 is rotated towards the second position in which holder 6 approaches to the cartridge loading section 3, the engagement piece 79 provided on the holding member 64 thrusts the lock pawl 78 of the lock member 65 for elastically displacing the elastic displacement unit 82 in a direction indicated by arrow J in FIG. 13A. When the holder 6 is rotated further in the direction of arrow C in FIG. 13A to approach to the cartridge loading section 3 to the second position in which the holder lies parallel to the cartridge loading section 3, as shown in FIG. 14A, the elastic displacement unit 82 is elastically reset in the direction indicated by arrow M in FIG. 14A to engage the engagement piece 79 with the lock pawl 78. The holder 6 is locked by this lock pawl 65 in its second position. Since the ejection lever 62 is held at this time by the holding piece 74 of the holding member 64, the ejection lever is held in a state in which the elastic force of restoration is stored in the tension spring 73 and in which the abutment piece 67 faces the front side 104b, 204b of the first or second disc cartridge 100 or 200 held by the holder 6.

When the holder 6 is rotated to its second position, the first or second disc cartridge 100 or 200, held by the holder 6, is loaded on the cartridge loading section 3, with the positioning pins 27, 27 provided on the cartridge loading section 3 engaging in the positioning holes 117, 118 and with the lower sides of the disc cartridge being supported by the height setting pins 28, 28 for setting the position of the disc cartridge in the horizontal and height directions. At this time, the magneto-optical disc 101 or the optical disc 201 housed in the first or second disc cartridge 100 or 200, respectively, is clamped on the disc table 9 for rotation in unison therewith, at the same time as the disc 101 or 201 is centered on the disc table 9. This completes the loading of the first or second disc cartridge 100 or 200.

After the first or second disc cartridge 100 or 200 is loaded on the cartridge loading section 3, the disc driving unit is driven for recording or reproducing information signals on or from the disc 101 or 201 clamped on the disc table 9.

Figure 15:
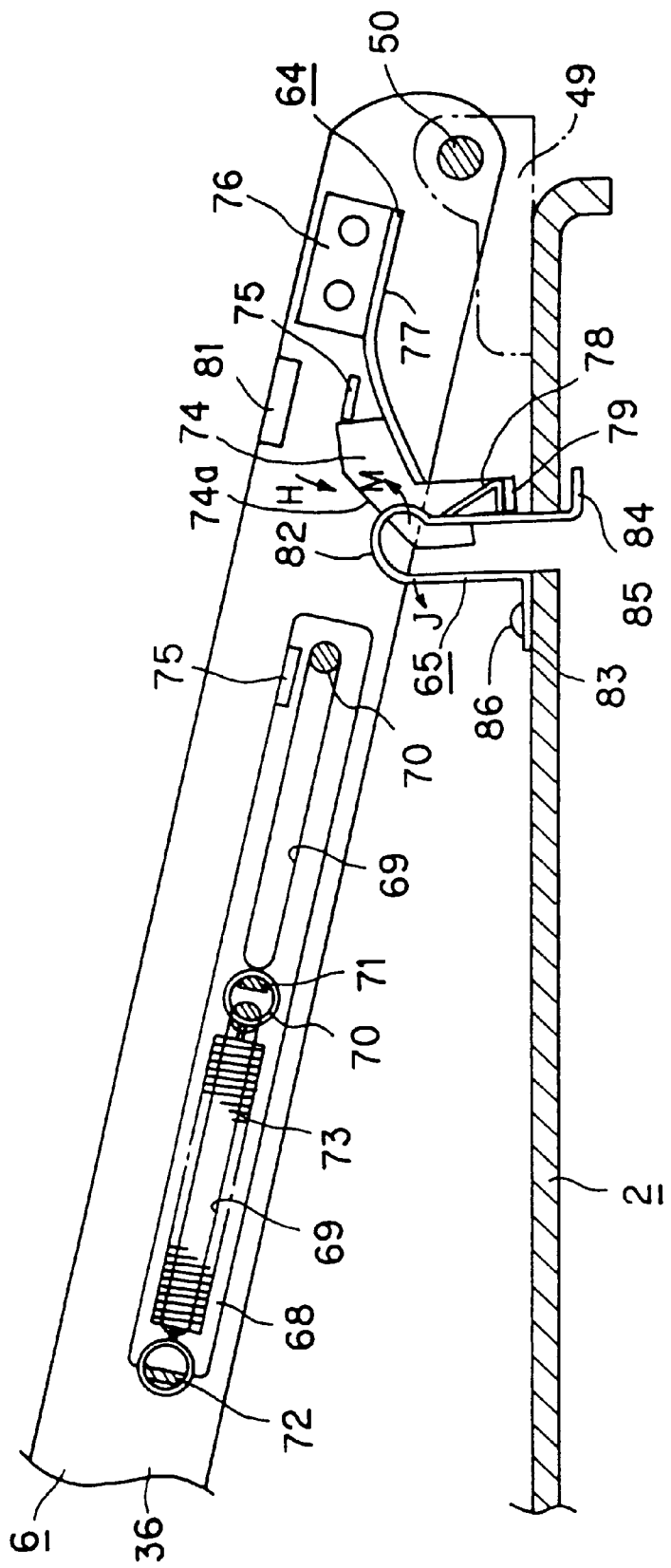
FIG. 15 is a side view showing the state in which the holder is being rotated from its second position to its first position.

For taking out the first or second disc cartridge 100 or 200 held on the holder 6, after completion of recording or reproduction of information signals on or from the disc 101 or 201, the holder 6 locked in the second position as shown in FIG. 14A is rotated in the direction indicated by arrow D in FIGS. 5 and 14, about the pivot shafts 47, 50 as the center of rotation. When the holder 6 is rotated from the second position in a direction indicated by arrow D in FIG. 14A, the elastic displacement piece 77 is elastically displaced in the direction indicated by arrow H in FIG. 15 because the holding member 64 has the engagement piece 77 engaged with the lock pawl 78 of the lock member 65. The elastic displacement unit 82 of the lock member 65 also is elastically displaced in the direction of arrow J in FIG. 15. When the elastic displacement piece 77 is elastically displaced in the direction indicated by arrow H in FIG. 15, the holding piece 74 provided on the distal end of the elastic displacement piece 77 also is elastically displaced in the direction of arrow H in FIG. 15. When the holder 6 reaches the mid position of rotation from the second position to the first position, the holding piece 74 is displaced significantly in the direction indicated by arrow H in FIG. 15 for disengaging the engagement piece 75 of the ejection elver 62 from the holding piece 74. When the ejection lever 62 ceases to be held by the holding member 64, the ejection lever 62 is shifted in the direction of arrow M in FIG. 13, under the bias of the tension spring 73. Thus, the abutment piece 67 thrusts the first or second disc cartridge 100 or 200 held by the holder 6 for extruding the disc cartridge 100 or 200 towards the cartridge entrance/exit opening 40 for ejecting the disc cartridge out of the holder 6.

The first or second disc cartridge 100 or 200 extruded from the holder 6 via cartridge entrance/exit opening 40 can be gripped and pulled out for taking out the disc cartridge from the holder 6.

When moved by the ejection lever 62 in a direction of being ejected from the holder 6, the first or second disc cartridge 100 or 200 held by the holder 6 provides for relative movement between the main cartridge body portion 104 or 204 and the shutter 110 or 210. That is, the shutter 110 or 210 is moved in a direction of closing the aperture 108, 109 or 208 as indicated by arrow B in FIGS. 1, 2 and 4.

For ejecting the first or second disc cartridge 100 or 200 from the holder 6, the insertion piece 66 is inserted into the groove 115, so that the ejection lever 62 can be reliably thrust in the direction of ejecting the first or second disc cartridge 100 or 200 from the holder 6.

There are occasions wherein, when the holder 6 is rotated from the second position to the first position to disengage the engagement piece 79 of the holding member 64 from the lock pawl 78, the elastic displacement piece 77 is abruptly reset elastically in the direction indicated by arrow H in FIG. 14. At this time, the holding piece 74 compresses against the control piece 81 provided on the holder 6 for prohibiting protrusion of the holder 6 vertically upwards as well as promptly suppressing vibrations of the elastic displacement piece 77.

Industrial Applicability

As described above, the disc cartridge loading device according to the present invention has a holding unit for holding an ejection lever at the insertion end position at the holder and for releasing the holding on the ejection lever when the holder is moved from the second position of loading the disc cartridge to the first position of inserting or ejecting the disc cartridge. Thus, the disc cartridge can be ejected from the holder in association with the holder movement thus assuring positive ejection of the disc cartridge from the holder. Moreover, since the holder and the ejection lever are held and locked by the common holding unit, the structure can be simplified to reduce the size of the loading device itself.

What is claimed is:

1. A disc cartridge loading apparatus for loading a disc cartridge having a groove formed on one lateral surface for extending along an inserting direction and a shutter provided for movement along the lateral surface formed with said groove, comprising:
    a holder for insertion of the disc cartridge therein and for holding the disc cartridge inserted therein, said holder being moveable between a first position for insertion or ejection of said disc cartridge and a second position lowered from said first position;
    an ejection lever movably mounted on said holder, said ejection lever being at least partially inserted into the groove of said disc cartridge on completion of insertion of the disc cartridge into said holder, said ejection lever being biased in a direction of ejecting the disc cartridge, inserted into the holder, out of the holder, and said ejection lever being movable with the disc cartridge without undergoing rotational displacement during insertion of the disc cartridge; and
    a holding unit for holding said ejection lever at the insertion end position of insertion of the disc cartridge into said holder and for releasing the holding on said ejection lever when the holder is moved from said second position to said first position.

2. The disc cartridge loading apparatus as claimed in claim 1 wherein said ejection lever includes an inserting portion inserted into the groove of the disc cartridge introduced into said holder and an abutment portion abutted against the disc cartridge inserted into the holder.

3. The disc cartridge loading apparatus as claimed in claim 2 wherein said abutment portion is formed at a distal end side of said inserting portion substantially perpendicularly to said inserting portion so as to be abutted against the front side in the inserting direction of the disc cartridge inserted into said holder.

4. The disc cartridge loading apparatus as claimed in claim 1 further comprising:

a biasing member for biasing the disc cartridge inserted into the holder out of the holder.

5. The disc cartridge loading apparatus as claimed in claim 1 wherein said holding unit includes a holding portion for engaging with the ejection lever moved by said disc cartridge inserted into said holder for holding said ejection lever and a lock unit for holding the holder in said second position.

6. The disc cartridge loading apparatus as claimed in claim 5 wherein said holding unit includes a holding member provided with said holding portion and wherein said lock unit includes a lock member for engaging with said holding member when said holder is in said second position.

7. A disc cartridge loading apparatus for loading a disc cartridge having a groove formed on one lateral surface for extending along an inserting direction and a shutter provided for movement along the lateral surface formed with said groove, comprising:
    a holder for insertion of the disc cartridge therein and for holding the disc cartridge inserted therein, said holder being moveable between a first position for insertion or ejection of said disc cartridge and a second position lowered from said first position;
    an ejection lever movably mounted on said holder, said ejection lever being at least partially inserted into the groove of said disc cartridge on completion of insertion of the disc cartridge into said holder, said election lever being biased in a direction of ejecting the disc cartridge, inserted into the holder, out of the holder; and
    a holding unit for holding said ejection lever at the insertion end position of insertion of the disc cartridge into said holder and for releasing the holding on said ejection lever when the holder is moved from said second position to said first position, said holding unit including
        a holding portion for engaging with the ejection lever moved by said disk cartridge inserted into said holder for holding said ejection lever, and
        a lock unit for holding the holder in said second position, and
    wherein said holding unit includes a holding member provided with said holding portion and said lock unit includes a lock member for engaging with said holding member when said holder is in said second position, and
    wherein said lock unit releases the holding on said ejection lever by said holding portion when said holder is moved from said second position to said first position.

8. A disc cartridge loading apparatus for loading a disc cartridge having a groove formed on one lateral surface for extending along an inserting direction and a shutter provided for movement along the lateral surface formed with said groove, comprising:
    a holder for insertion of the disc cartridge therein and for holding the disc cartridge inserted therein, said holder having a substantially quadrilateral plate-shaped portion, paired sidewall sections formed on paired sides of the quadrilateral plate-shaped portion and a plurality of holding pieces formed on the distal ends of said paired sidewall sections, said holder being moveable between a first position for insertion or ejection of said disc cartridge and a second position lowered from said first position;
    an ejection lever movably mounted on said holder, said ejection lever being moved by the disc cartridge inserted into the holder, said ejection lever being at least partially inserted into the groove of said disc cartridge on completion of insertion of the disc cartridge into said holder, said ejection lever being biased in a direction of ejecting the disc cartridge, inserted into the holder, out of the holder, and said ejection lever being movable with the disc cartridge without undergoing rotational displacement during insertion of the disc cartridge; and a holding unit provided on one of the paired sidewall sections of the holder for holding said ejection lever at the insertion end position of insertion of the disc cartridge into said holder and for releasing the holding on said ejection lever when the holder is moved from said second position to said first position.

9. The disc cartridge loading apparatus as claimed in claim 8 wherein said ejection lever is arranged on said one sidewall section of said holder and includes an inserting portion formed substantially perpendicularly to said movable portion and which is inserted into a groove of the disc cartridge inserted into said holder and an abutment portion compressing against the disc cartridge inserted into said holder, said ejection lever being movably mounted on said one sidewall section.

10. The disc cartridge loading apparatus as claimed in claim 9 wherein said abutment portion is formed at a distal end of said inserting portion substantially perpendicularly to said inserting portion for abutment on the front side in the inserting direction of the disc cartridge inserted into the holder.

11. The disc cartridge loading apparatus as claimed in claim 10 wherein said abutment portion is at the forward edge in the disc cartridge inserting direction into the holder on completion of the disc cartridge into the holder.

12. The disc cartridge loading apparatus as claimed in claim 9 further comprising:

a biasing member provided between said one sidewall section of said holder and said movable portion for biasing the disc cartridge inserted into the holder in an ejecting direction from the holder.

* * * * *